US007739276B2

(12) United States Patent
Lee et al.

(10) Patent No.: US 7,739,276 B2
(45) Date of Patent: Jun. 15, 2010

(54) METHOD, SYSTEM, AND MEDIUM FOR RETRIEVING PHOTO USING MULTIMODAL INFORMATION

(75) Inventors: Jae Won Lee, Seoul (KR); Yong Ju Jung, Daeleon (KR); Ick Sang Han, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 349 days.

(21) Appl. No.: 11/822,156

(22) Filed: Jul. 2, 2007

(65) Prior Publication Data

US 2008/0010275 A1 Jan. 10, 2008

(30) Foreign Application Priority Data

Jul. 4, 2006 (KR) ..................... 10-2006-0062592

(51) Int. Cl.
*G06F 17/30* (2006.01)

(52) U.S. Cl. ............... 707/723; 707/759; 707/E17.019; 707/E17.02

(58) Field of Classification Search ..................... 707/5, 707/3, 7, E17.019, E17.02
See application file for complete search history.

(56) References Cited

U.S. PATENT DOCUMENTS 5,541,836 A 7/1996 Church et al.
5,579,471 A 11/1996 Barber et al.
5,696,964 A * 12/1997 Cox et al. ...................... 707/5
5,721,902 A * 2/1998 Schultz .......................... 707/4
6,098,033 A 8/2000 Richardson et al.
6,182,069 B1 * 1/2001 Niblack et al. ................. 707/6
6,243,713 B1 * 6/2001 Nelson et al. ............ 707/104.1
6,477,269 B1 11/2002 Brechner
6,574,616 B1 * 6/2003 Saghir ........................... 707/1
6,704,729 B1 * 3/2004 Klein et al. .................... 707/5
6,970,860 B1 * 11/2005 Liu et al. ....................... 707/3

(Continued)

FOREIGN PATENT DOCUMENTS

KR 1997-0010030 6/1997

(Continued)

OTHER PUBLICATIONS

Srihari et al., "A Model for Multimodal Information Retrieval", Conference on Multimedia 2000, pp. 1-4, accessed online at Google Search engine <http://www.google.com> on Jan. 27, 2010.*

*Primary Examiner*—Charles Rones
*Assistant Examiner*—Phuong-Thao Cao
(74) *Attorney, Agent, or Firm*—Staas & Halsey LLP

(57) ABSTRACT

A photo retrieval method, system, and medium using multimodal information which prevents a photo of an irrelevant category to be retrieved having a high ranking due to an unfavorable side effect from a query expansion, by reflecting a level of consistency between an object category of a query and a category of a photo retrieved by expansion retrieval using ontology, to a photo retrieval result ranking is provided. The photo retrieval method using the multimodal information includes: assigning an object category with respect to a query; retrieving photos associated with an expanded query term extracted from the query; determining a ranking of the retrieved photo by reflecting the assigned object category; and arranging and displaying the photos in response to the determined ranking.

18 Claims, 6 Drawing Sheets

PHOTO RETRIEVAL SYSTEM 200

CATEGORY ASSIGNMENT UNIT 210

EXPANSION RETRIEVAL UNIT 220

RANKING DETERMINATION UNIT 230

PHOTO ARRANGEMENT UNIT 240

U.S. PATENT DOCUMENTS

| | | | | |
|---|---|---|---|---|
| 7,089,226 | B1 * | 8/2006 | Dumais et al. | 707/3 |
| 7,475,092 | B2 * | 1/2009 | Rothschild | 707/104.1 |
| 7,523,103 | B2 * | 4/2009 | Goel et al. | 707/3 |
| 2004/0225686 | A1 * | 11/2004 | Li et al. | 707/104.1 |
| 2004/0260677 | A1 * | 12/2004 | Malpani et al. | 707/3 |
| 2005/0055344 | A1 * | 3/2005 | Liu et al. | 707/3 |
| 2006/0112092 | A1 * | 5/2006 | Ziou et al. | 707/5 |
| 2007/0036371 | A1 * | 2/2007 | Buil et al. | 381/312 |
| 2007/0174872 | A1 * | 7/2007 | Jing et al. | 725/46 |
| 2007/0250487 | A1 * | 10/2007 | Reuther | 707/3 |
| 2008/0059456 | A1 * | 3/2008 | Chowdhury et al. | 707/5 |
| 2008/0172362 | A1 * | 7/2008 | Shacham et al. | 707/3 |
| 2008/0172374 | A1 * | 7/2008 | Wolosin et al. | 707/5 |
| 2008/0292196 | A1 * | 11/2008 | Jain et al. | 382/225 |
| 2009/0125505 | A1 * | 5/2009 | Bhalotia et al. | 707/5 |

FOREIGN PATENT DOCUMENTS

KR 10-2000-0054860 9/2000

* cited by examiner

METHOD, SYSTEM, AND MEDIUM FOR RETRIEVING PHOTO USING MULTIMODAL INFORMATION

CROSS-REFERENCE TO RELATED APPLICATIONS

This application claims the benefit of Korean Patent Application No. 10-2006-0062592, filed on Jul. 4, 2006, in the Korean Intellectual Property Office, the disclosure of which is incorporated herein by reference.

BACKGROUND OF THE INVENTION

1. Field of the Invention

The present invention relates to a photo retrieval method, system, and medium using multimodal information which prevents a photo of an irrelevant category to be retrieved as a high ranking due to an unfavorable side effect from a query expansion, by reflecting a level of consistency between an object category of a query and a category of a photo retrieved by expansion retrieval using ontology, to a photo retrieval result ranking.

2. Description of the Related Art

Popularization of digital cameras and camera phones cause many changes associated with using a photo. Unlike making a print of a photo on paper and semi-permanently storing the photo, in a digital camera, more images are easily photographed, deleted, and stored electronically. Currently, as memory capacity increases, an amount of storing photos increases in proportion. A user may store more photos due to an increase in the amount of storage available for the photos. However, storing more photos increases the difficulty of arranging photos or retrieving a particular photo.

A conventional photo retrieval method depends on retrieval by simply browsing or manual arrangement. It is not easy to retrieve several hundreds or thousands of photos by simply browsing.

To improve a browsing retrieval method, a configuration performing photo retrieval by expansion retrieval using ontology is disclosed. Query expansion by ontology has an advantage of improving a recall rate, but has a disadvantage of decreasing precision. This is because a query term that is not suitable due to ambiguity is extracted as an expanded query term when expanding a query.

For example, in a conventional ontology expansion retrieval method, with respect to a query "friend", "friend, mate, fellow, and companion . . . " are extracted as expanded query terms. However, an error of retrieving a photo associated with "mate to the glove" that is irrelevant to the query "mate" may occur by using the expansion retrieval method.

Also, an error in retrieving a photo associated with "garden rank with weeds" as a retrieval result may occur by analyzing a query "rank (line)" as "rank (dense)".

Also, applying a method frequently used in conventional text-based retrieval methods to photo retrieval may prevent expansion to unnecessary query terms by analyzing a meaning of an ambiguous vocabulary by using peripheral contexts. The method using text analysis is suitable when retrieving a text file such as in a general retrieval from the Internet. However, when retrieving a photo including a short annotation, context information for analyzing a meaning may be insufficient. Also, since a keyword included in the annotation is not always suitable for the photo, there is a limit on retrieval by using only the text information.

Accordingly, a photo retrieval method, system, and medium using multimodal information, which can prevent an irrelevant photo from being retrieved, is acutely required.

SUMMARY OF THE INVENTION

Additional aspects, features, and/or advantages of the invention will be set forth in part in the description which follows and, in part, will be apparent from the description, or may be learned by practice of the invention.

An aspect of the present invention provides a photo retrieval method, system, and medium using multimodal information, capable of reducing an error in query expansion by using ontology to assign an object category with respect to a query term shown as an object in a photo from a query, and to determine a ranking of the expanded retrieved photos using the ontology by reflecting the object category.

An aspect of the present invention also provides a photo retrieval method, system, and medium using multimodal information capable of preferentially displaying a photo desired by a user to be higher-ranked, by improving recall rate by supporting expansion retrieval using ontology and determining a ranking by reflecting an object category assigned to a query.

According to an aspect of the present invention, there is provided a photo retrieval method implemented by a computing device including: assigning an object category based on a query; retrieving photos associated with an expanded query term extracted from the query; determining a ranking of the retrieved photos based on the assigned object category; and arranging and displaying the photos in response to the determined ranking.

According to another aspect of the present invention, there is provided a photo retrieval system using multimodal information, the system including: a category assignor to assign an object category based on a query; an expansion retriever to retrieve photos associated with an expanded query term extracted from the query; a ranking determiner to determine a ranking of the retrieved photos based on the assigned object category; and a photo arranger to arrange and to display the photos in response to the determined ranking.

According to another aspect of the present invention, there is provided at least one computer readable medium storing instructions that control at least one processor for executing a photo retrieval method, the method including: assigning an object category based on a query; retrieving photos associated with an expanded query term extracted from the query; determining a ranking of the retrieved photos based on the assigned object category; and arranging and displaying the photos in response to the determined ranking.

According to another aspect of the present invention, there is provided a photo retrieval method implemented by a computing device, including: extracting a query term from a query; assigning an object category based on the query; expanding the query term to form an expanded query term; retrieving photos associated with the expanded query term extracted from the query; and determining a ranking of the retrieved photos based on the assigned object category According to another aspect of the present invention, there is provided at least one computer readable medium storing instructions that control at least one processor for executing a photo retrieval method, the method including: extracting a query term from a query; assigning an object category based on the query; expanding the query term to form an expanded query term; retrieving photos associated with the expanded query term extracted from the query; and determining a ranking of the retrieved photos based on the assigned object category.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF THE PREFERRED EMBODIMENTS

Figure 1:
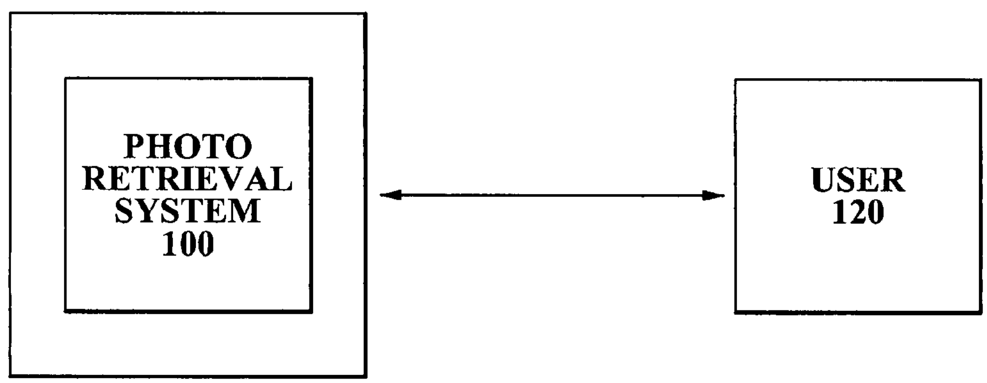
FIG. 1 is a diagram illustrating a query terminal device including a photo retrieval system according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below in order to explain the present invention by referring to the figures.

In exemplary embodiments, ontology may indicate a group of concepts such as objects, events, and relations defined as a certain natural language to make a vocabulary mutually compatible for information exchange. Namely, the ontology is a group of sub-concepts with respect to a certain concept or concepts having the same property. For example, the ontology with respect to a book may be a group of properties for explaining the book or a concept having the same properties of the book, such as another book, a publication, a writer, a publishing company, a page, and price. Also, the ontology with respect to the book may be a group of sub-concepts included in the book, such as a storybook, a comic book, and a novel.

A representative field using the ontology is an information retrieval field. The ontology of the information retrieval field may exist as a group of query terms or a thesaurus to prevent an error and to improve retrieval efficiency. For example, "unfare trade" inadvertently inputted by a retriever may be automatically corrected to be "unfair trade" by using the ontology in the form of a dictionary. More various retrieval services may be provided by using similar or related query terms such as unfair trade, monopoly, and dumping.

In exemplary embodiments, a level of consistency between a category of a photo expansion retrieved using the ontology and an object category assigned to a query using the ontology is reflected in ranking determination of a photo retrieval result, thereby more precisely retrieving photos stored in a query terminal device.

FIG. 1 is a diagram illustrating a query terminal device 110 including a photo retrieval system 100 according to an exemplary embodiment of the present invention. The photo retrieval system 100 more precisely retrieves photos stored in the query terminal device 110 by applying multimodal information, namely, text information and visual information.

The query terminal device 110 displays a list of photos retrieved and arranged according to a determined ranking by the photo retrieval system 100, on a predetermined screen, while connected to the photo retrieval system 100 built in the query terminal device 110, or separated from the externally located query terminal device 110.

Particularly, the query terminal device 110 includes a photographing function and stores an image photographed through a lens or externally received, in a predetermined memory, to provide an environment enabling the photo retrieval system 100 to retrieve the stored photos.

The query terminal device 110 may be a query terminal including a memory and having a computational ability by including a microprocessor. Examples of a query terminal device 110 may include a personal computer and a notebook computer. In the present exemplary embodiment, the query terminal device 110 may also be a mobile communication query terminal, a mobile phone, or a PDA, having excellent mobility.

A user 120 may indicate a user of the query terminal device 110, including the query terminal device for accessing the photo retrieval system 100 and generating a request for retrieving a certain photo desired to be retrieved from the photos stored in the query terminal device 110 by inputting a predetermined query.

In this case, the query is a word/sentence inputted by the user 120 that determined the query is associated with a photo desired to be retrieved. The photo retrieval system 100 extracts a photo whose memo information includes an expanded query term belonging to a group associated with the query based on ontology, as a result of retrieval.

The photo retrieval system 100 assigns an object category based on the query inputted by the user 120 to retrieve a photo, identifies a category of photos retrieved by expansion retrieval using the ontology, and enables a level of consistency between the object category and the category to be reflected to ranking determination of the retrieved photos. Accordingly, the photo retrieval system 100 may prevent a photo irrelevant to the category desired from being retrieved as an undesirable side effect occurring due to the expansion retrieval.

Figure 2:
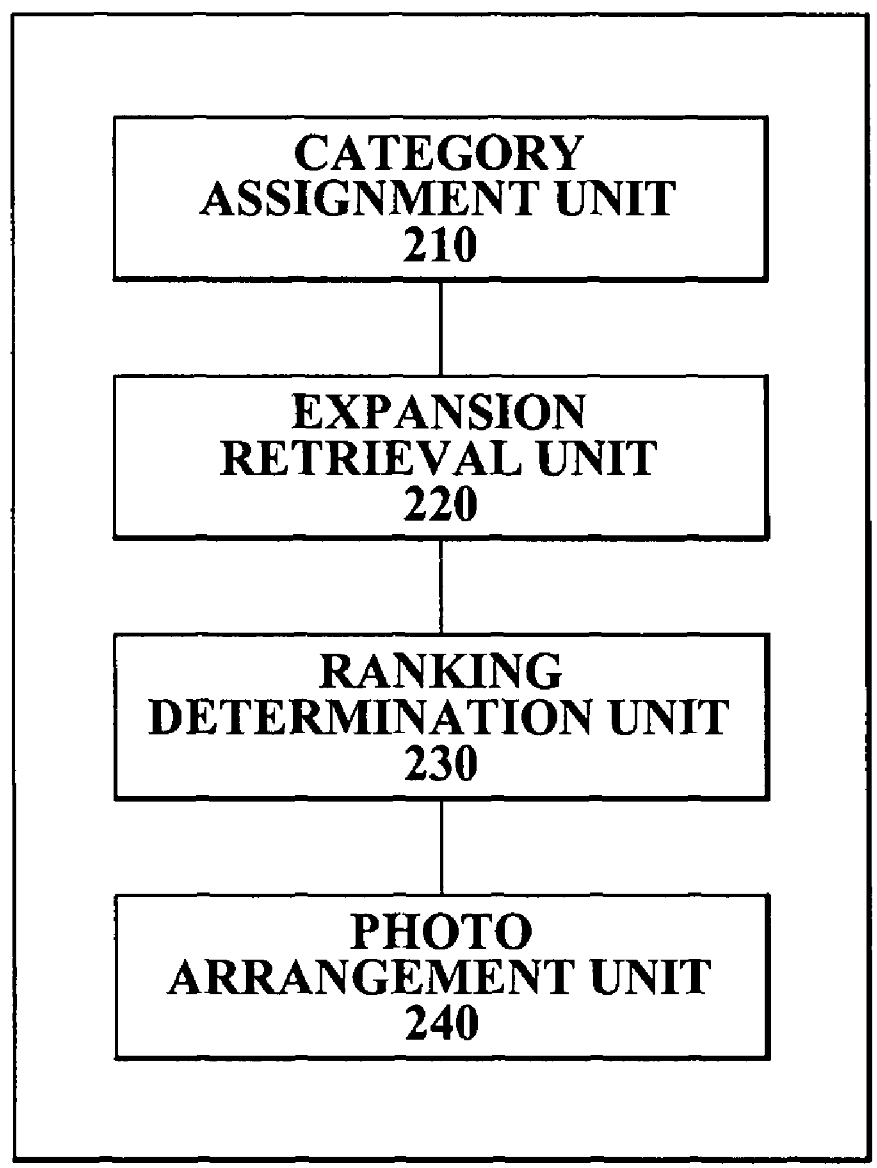
FIG. 2 is a diagram illustrating a detailed configuration of the photo retrieval system according to an exemplary embodiment of the present invention.

FIG. 2 is a diagram illustrating a detailed configuration of a photo retrieval system 200 according to an exemplary embodiment of the present invention. The photo retrieval system 200 includes a category assignment unit (category assignor) 210, an expansion retrieval unit (expansion retriever) 220, a ranking determination unit (ranking determiner) 230, and a photo arrangement unit (photo arranger) 240.

The category assignment unit 210 assigns an object category by text based classification, with respect to a query inputted for photo retrieval. When assigning the object category, the category assignment unit 210 selects a keyword from query terms forming the query. In this case, a query term indicating an object shown in a photo from the query term is determined to be the keyword. For example, the category assignment unit 210 determines query terms associated with an object such as a sea and mountain, an animal, and a building, which can be precisely recognized in the photo, as the keyword, rather than abstract concepts such as a place name, time, and an event.

For example, when a query "a view taken at a boat in holidays" or "a view taken from a boat during holiday" is inputted by a user, the category assignment unit 210 may select, as a keyword, the term "boat" that is a query term from query term(s) forming the query and may be shown in a photo as an object.

The category assignment unit 210 calculates a distance between the selected keyword and an object category previously defined by the ontology, and the category assignment unit 210 assigns an object category with the smallest calculated distance. Specifically, the object category nearest to the keyword is assigned as the new keyword by the category assignment unit 210.

With respect to the query term "boat" selected to be the keyword, the category assignment unit 210 may calculate distances from various object categories and may assign a "ship" whose distance is nearest, as the object category with respect to the query. Alternatively, if "boat" is an object category previously defined by the ontology, then the category assignment unit 210 may indicate that the query term "boat" is the shortest distance, and may assign "boat" as the object category.

The expansion retrieval unit 220 retrieves a photo using an expanded query term extracted from a query. In this case, the expanded query term may indicate a synonym or a hyponym existing in the ontology associated with the query. Namely, the expansion retrieval unit 220 identifies synonyms and/or hyponyms included in the same group in the ontology in which the query inputted by the user 120 exists, as expanded query terms and retrieves photos stored in the query terminal device by using the identified expanded query terms.

For example, with respect to "a view taken at a boat in holidays", the expansion retrieval unit 220 may verify meaningful query terms "boat" and "holidays" by analyzing a morpheme and removing a modifier/stop word. The expansion retrieval unit 220 may identify "holidays" and "vacation" existing in the same group in the ontology with respect to the query term "holidays" where "holiday" and "vacation" are the expanded query terms. The expansion retrieval unit 220 may identify the terms "boat", "ferry", and "gondola" existing in the same group in the ontology with respect to the query term "boat" where "boat", "ferry", and "gondola" are the expanded query terms. The expansion retrieval unit 220 can retrieve photos by using each of the identified expanded query terms, such as "holidays", "vacation", "boat", "ferry", and "gondola".

When retrieving photos, the expansion retrieval unit 220 identifies memo information including the identified expanded query terms from a predetermined memory (not shown) and extracts a photo corresponding to the identified memo from the memory, thereby retrieving the photo. The memory is a kind of a storage storing a photo and memo information corresponding to the photo and may be selectively included in the query terminal device 110 or the photo retrieval system 200. The memo information may indicate an annotation and description with respect to a photo, made by the user 120.

The ranking determination unit 230 gives a score to each of the retrieved photos by reflecting the assigned object category and determines rankings of the photos depending upon the given score. Namely, the ranking determination unit 230 gives a score to which a predetermined weight is applied to the retrieved photo by considering retrieval precision and determines a ranking of each of the photos in response to the given score. The ranking is used as a reference for arranging the retrieved photos by the photo arrangement unit 240.

When giving the score to the photo, the ranking determination unit 230 identifies a category corresponding to the retrieved photo by referring to content of the photo. Namely, the ranking determination unit 230 classifies categories included in the photo, based on the visual content of the photo. The classification of the category may be performed by the ranking determination unit 230 in real time simultaneously with the retrieval of the photo or may be previously performed by an administrator of the photo retrieval system before the photo retrieval. When the classification of the category is previously performed, the administrator makes a category list in the form of metadata and the ranking determination unit 230 quickly classifies a category of a photo by using the category list.

Also, the ranking determination unit 230 compares the object category assigned by the category assignment unit 210 with the identified category of the photo, and the ranking determination unit 230 determines an Image_Score depending upon a level of consistency between the categories. For example, the ranking determination unit 230 may determine the relatively high Image_Score when the object category assigned to the query is precisely identical with the category of the photo and may determine the low Image_Score when the object category is not identical with the category of the photo.

The ranking determination unit 230 gives the score to the retrieved photo by applying the determined Image_Score and a previously provided weight. Namely, the ranking determination unit 230 calculates retrieval precision to what extent the retrieved photo matches retrieval intension of the user 120, in query terms of a numerical value.

When giving the score, the ranking determination unit 230 may give the score by using query term frequency, document frequency, and image classification with respect to the photo.

In the present exemplary embodiment, the ranking determination unit 230 may calculate a score $S_i$ that will be given to each photo, satisfying Equation 1 in which the query term frequency, document frequency, and image classification are included as factors.

$$s_i = w \times \text{TF\_IDF\_Score} + (1-w) \times \text{Image\_Score} \qquad \text{[Equation 1]}$$

In this case, w indicates a weight value for TF_IDF_Score. Specifically, w is a value previously determined by a user or an optimization process depending upon whether a score of a term corresponding to the TF_IDF_Score is given more importance, or whether the Image_Score is given more importance. The TF_IDF_Score indicates a value of modeling a probability that an expanded query term is included in memo information of a corresponding photo, and the Image_Score may indicate a probability value that a corresponding category exists in a corresponding photo.

The TF_IDF_Score may be calculated satisfying Equation 2.

$$\text{TF\_IDF\_Score} = Pr(D_i \mid t_1 \ldots t_n) \cong \prod_{j=1}^{n} Pr(t_j \mid D_i) / Pr(DF_{tj}) \qquad \text{[Equation 2]}$$

In this case, D indicates an annotation part of the photo, t indicates a query term, and document frequency (DF) indicates how many photos the query term is shown in the annotation part.

Also, the Image_Source may be calculated satisfying Equation 3.

Image_Score = [Equation 3]

$$Pr(I_i \mid c_1 \ldots c_n) \cong \prod_{j=1}^{n} Pr(c_j \mid I_i) / Pr(I_i) \cong \prod_{j=1}^{n} Pr(g_i)$$

In this case, I indicates an image part of the photo, c indicates a category with respect to a keyword, $g_i$ is a reliability factor that is an output of a pattern classifier such as support vector machine (SVM), and $Pr(g_i)$ indicates a posterior probability value acquired by recalculating the reliability factor by probability.

Equation 3 may exist under assumption that $Pr(I_i)$ that is a probability of showing an image is equally probable.

Depending upon the given score, a ranking of each of the retrieved photos may be determined. For example, the ranking determination unit 230 may give a relatively high ranking to a photo whose score is high and may give a relatively low ranking to a photo whose score is low.

The photo arrangement unit 240 displays the retrieved photos in response to the determined ranking. Namely, the photo arrangement unit 240 arranges the retrieved photos depending upon the determined ranking, by considering retrieval precision. For example, the photo arrangement unit 240 may enable a highest ranked photo to be displayed in top of a screen.

Thus, according to an exemplary embodiment, the object category with respect to the query term shown as an object in the photo from the query is assigned and the ranking of the photos expansion retrieved using ontology is determined by considering the object category, thereby reducing an error of query expansion using the ontology.

Figure 3:
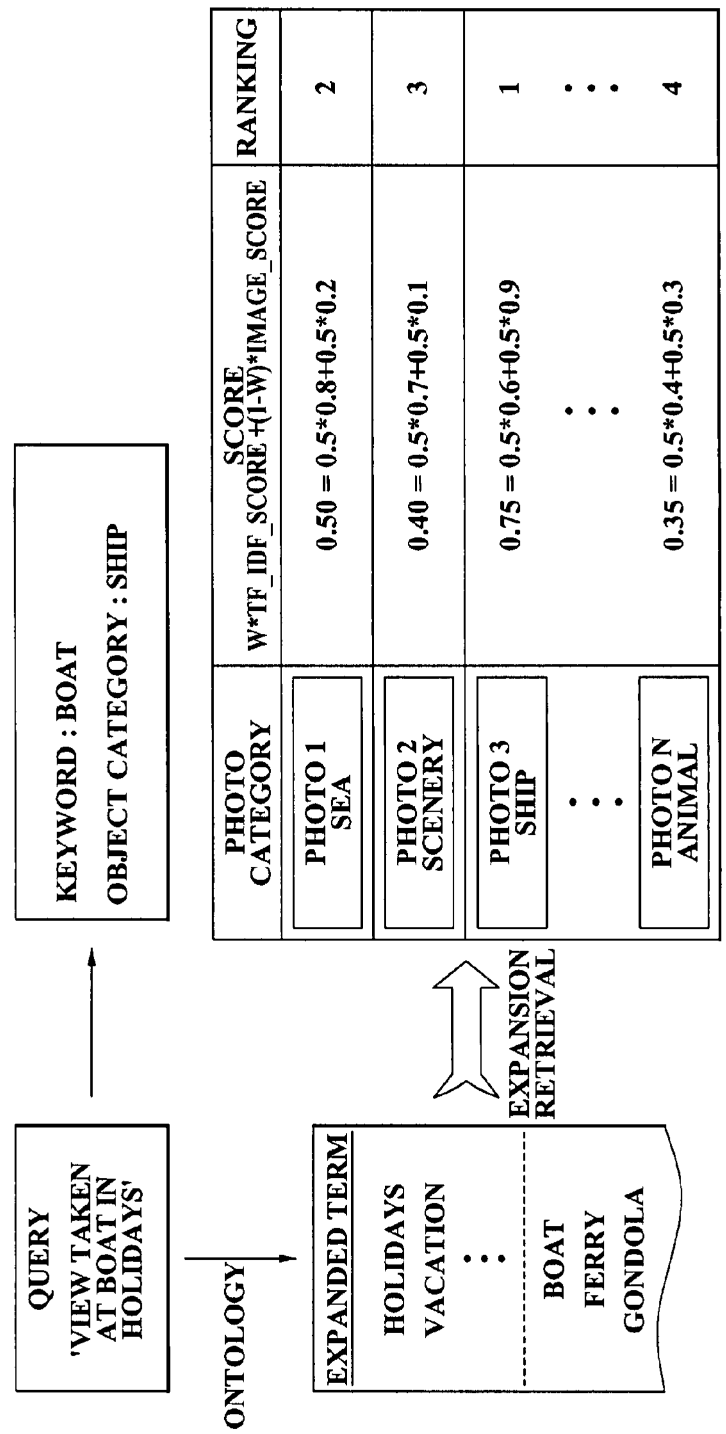
FIG. 3 is a diagram illustrating an example of displaying a photo retrieval result according to an exemplary embodiment of the present invention.

FIG. 3 is a diagram illustrating an example of displaying a photo retrieval result according to an exemplary embodiment of the present invention.

As described above, the photo retrieval system 200 gives a score to a retrieved photo by using an Image_Score differently determined depending upon whether an object category assigned with respect to a query inputted for photo retrieval by a user is consistent with a category of the photo expansion retrieved by using ontology. Also, the photo retrieval system 200 determines a ranking with respect to each photo depending upon the given score and provides the photos arranged in response to the determined ranking, to the user.

In FIG. 3, a retrieval process of the photo retrieval system 200 when the user want to retrieve photos stored in the query terminal device 110 inputs query "a view taken at a boat in holidays" is illustrated.

The photo retrieval system 200 determines a query term "boat" that may be shown as an object in the photo, from query terms forming the query "a view taken at a boat in holidays", as a keyword.

Also, the photo retrieval system 200 assigns a nearest object category by calculating a distance between the determined keyword and the object category previously defined on the ontology. In the above, the photo retrieval system 200 may assign "ship" nearest to the keyword "boat" as the object category with respect to the query "a view taken at a boat in holidays".

When the object category with respect to the query is determined, the photo retrieval system 200 may retrieve the photos stored in the terminal device 110 by expansion retrieval. With respect to the query "a view taken at a boat in holidays", the photo retrieval system 200 analyzes the query by using a parser and extracts meaningful query terms "holidays" and "boat" by removing a modifier and a stopword. The photo retrieval system 200 expands the query using ontology and identifies "holidays" and "vacation" with respect to the query term "holidays" on the ontology and "boat", "ferry", and "gondola" with respect to the "boat" on the ontology, as expanded query terms. The photo retrieval system 200 can perform expansion retrieval using the identified expanded query terms "holidays", "vacation", "boat", "ferry", and "gondola". In FIG. 3, n number of photos are retrieved by the expansion retrieval.

Also, the photo retrieval system identifies a category of the retrieved photo. The category identification may be performed by category classification performed by the photo retrieval system 200 in real time or may be performed by using a category list in the form of previously made meta data. The photo retrieval system 200 may classify the category based on an image content of the photo.

The photo retrieval system 200 compares the identified category of the photo with the assigned object category and determines the Image_Score of Equation 1 depending upon a level of consistency between the categories. The Image_Score is determined depending upon a level of consistency between the object category included in the query and the category generated by analyzing image contents. Specifically, the photo retrieval system 200 gives a score with respect to each of the retrieved photo by using the Image_Score determined depending upon the level of consistency between the categories Namely, the photo retrieval system 200 determines a predetermined retrieval score with respect to the photo by using term frequency, document frequency, and image classification information and gives the score to the retrieved photo by reflecting the weight.

In FIG. 3, the photo retrieval system 200 may determine a TF_IDF_Score of 0.6 with respect to photo3 and may give a relatively high Image_Score of 0.9 as an object category "ship" assigned to the query "a view taken at a boat in holidays" is consistent with a category "ship" of a photo3.

Also, the photo retrieval system 200 determines a ranking of each photo by considering the determined score, thereby determining a photo arrangement form on a screen. For example, the photo retrieval system 200 may determine the photo3, whose score is highest, to be a top ranking and may arrange the retrieved photos to display the photo3 on the top of the screen.

Accordingly, in the present exemplary embodiment, a recall rate is improved by supporting expansion retrieval using ontology, and a photo that the user wants to retrieve is preferentially displayed to the user at a higher ranking by determining a ranking reflecting an object category assigned to a query.

Hereinafter, a flow of operations of the photo retrieval system 200 according to the present exemplary embodiment will be described in detail.

Figure 4:
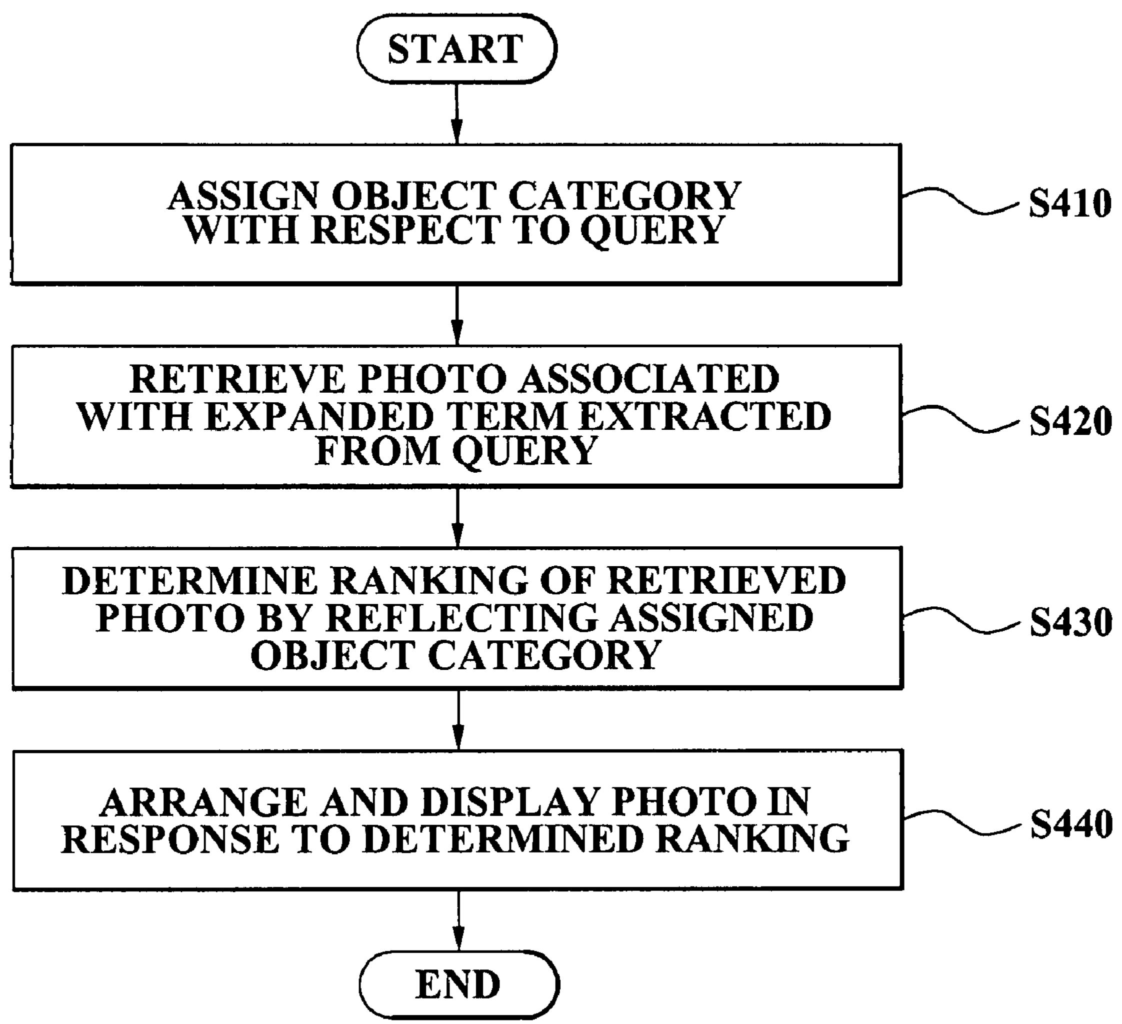
FIG. 4 is a flowchart illustrating a photo retrieval method using multimodal information, according to an exemplary embodiment of the present invention.

FIG. 4 is a flowchart illustrating a photo retrieval method using multimodal information, according to an exemplary embodiment of the present invention. The photo retrieval method is performed by the above photo retrieval system 200.

The photo retrieval system 200 assigns an object category with respect to a query (operation S410). In operation S410, an object category of a photo desired for retrieval is classified by analyzing the query inputted by a user wanting photo retrieval (text based classification). Namely, in the text based classification, the photo retrieval system 200 assigns a nearest object category by calculating a distance between a keyword and an object category previously defined on ontology. A query term shown as an object in the photo from query terms forming the query may be determined to be the keyword. For example, when the query "a view taken at a boat in holidays" is inputted, the photo retrieval system 200 may determine a query term "boat" that may be shown in the photo to be the keyword and may assign "ship" calculated to be a distance nearest to the keyword "boat", as the object category with respect to the query term (refer to FIG. 3).

Also, the photo retrieval system 200 retrieves a photo associated with an expanded query term drawn from the query (operation S420). In operation S420, synonym(s) and/or hyponym(s) existing in ontology associated with the query is/are extracted as an expanded query term to perform expansion retrieval with respect to the photo by using the extracted expanded query term.

Figure 5:
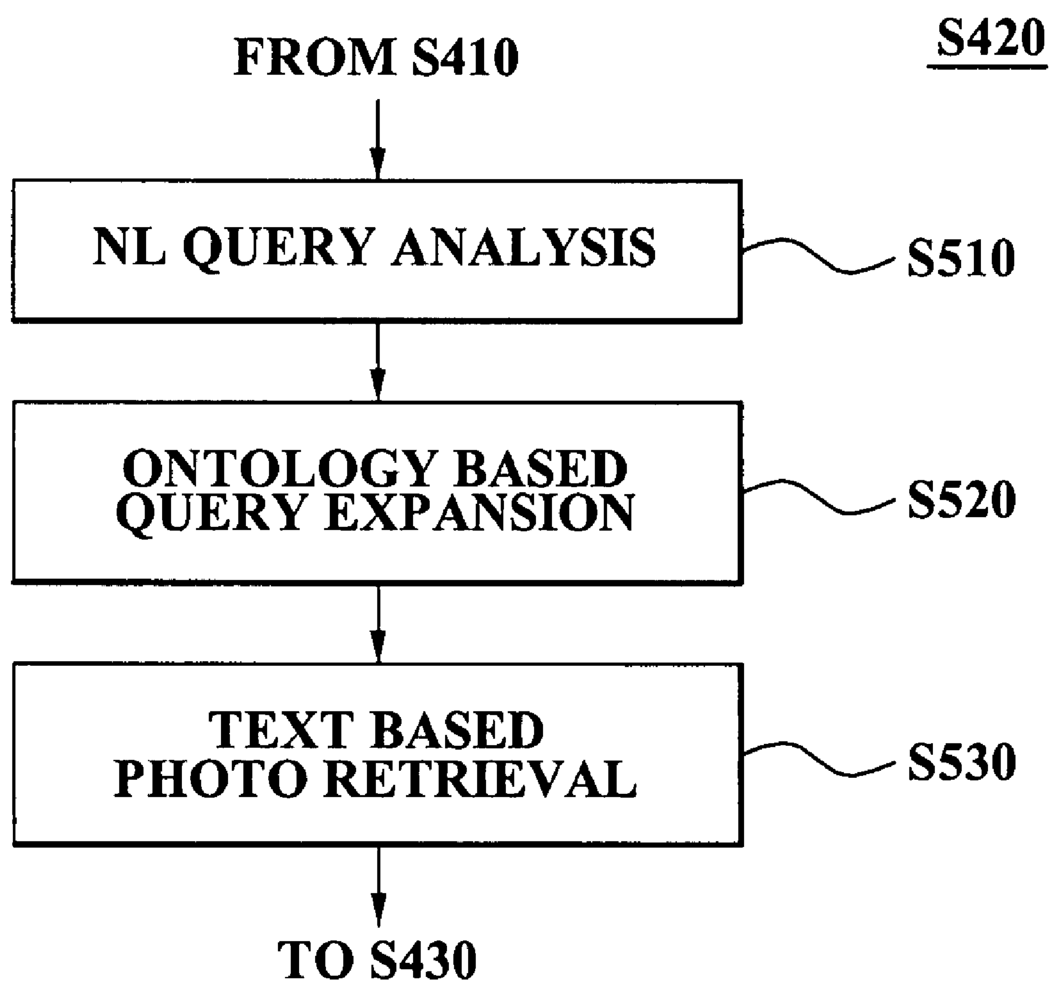
FIG. 5 is a flowchart illustrating an example of expansion retrieval using ontology, according to an exemplary embodiment of the present invention as illustrated in FIG. 4.

FIG. 5 is a flowchart illustrating an example of expansion retrieval using ontology, according to an exemplary embodiment of the present invention.

The photo retrieval system 200 analyzes a query that is a natural language of a query inputted for photo retrieval by using a parser (operation S510). Operation S510 is a process of "NL Query Analysis" of extracting morphemes from a query by morpheme analysis. The photo retrieval system 200 extracts a meaningful keyword by removing a modifier or a stop word from the morphemes.

Also, the query retrieval system 200 expands the query using the ontology (operation S520). Operation S520 is a process of "Ontology Based Query Expansion" of expanding the query by searching synonym(s) and/or hyponym(s) belonging to the same group on the ontology associated with an extracted query term.

The photo retrieval system 200 performs text based retrieval by using the expanded query term (operation S530). Operation S530 is a process of "Text Based Photo Retrieval" of identifying memo information including the expanded query term from a predetermined memory and extracts a photo corresponding to the identified memo information from the memory. Also, the photo retrieval system 200 acquires the TF_IDF_Score used in the above-described Equation 1 in a text-based photo retrieval process of operation S530.

Thus, according to an exemplary embodiment of the present invention, robust photo retrieval may be performed and a recall rate may be improved by extracting an expanded query term using ontology and retrieving a photo by expansion retrieval.

Referring to FIG. 4 again, the photo retrieval system 200 determines a ranking with respect to the retrieved photo by reflecting the assigned object category (operation S430). In operation S430, a score is given to the retrieved photo by considering retrieval precision and a ranking that becomes a basis for arranging photos is determined depending upon the given score.

Figure 6:
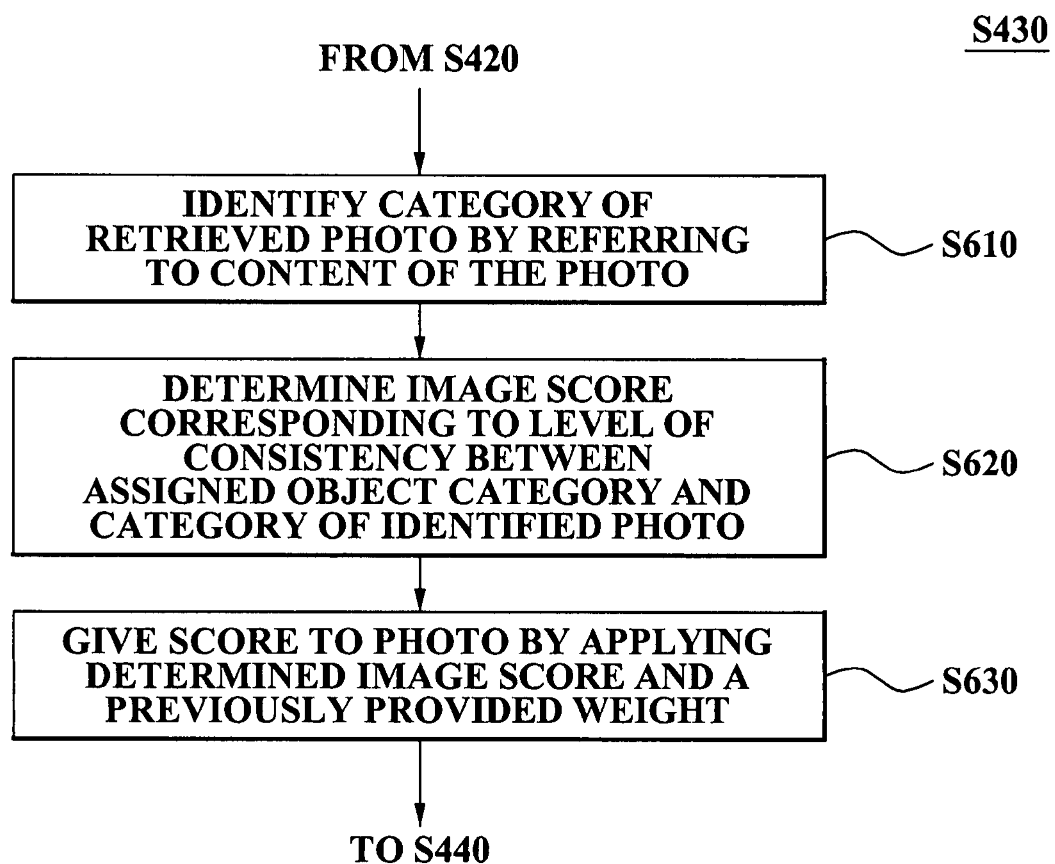
FIG. 6 is a flowchart illustrating an example of determining a ranking of a photo, according to an exemplary embodiment of the present invention as illustrated in FIG. 4.

FIG. 6 is a flowchart illustrating an example of determining a ranking of a photo, according to an exemplary embodiment of the present invention.

The photo retrieval system 200 identifies a category with respect to the retrieved photo by referring to an image content of the retrieved photo (operation S610). Operation S610 is a process of classifying a category included in the retrieved photo, based on the image content of the retrieved photo. The photo retrieval system 200 may classify the category in real time by coupling with photo retrieval. As another example, the photo retrieval system 200 may include a category list in the form of meta data, previously made, to real time operation in the terminal device 110 and may classify the category of the photo by meta data parsing with respect to the category list.

Also, photo retrieval system 200 measures a level of consistency between the assigned object category and the identified category of the photo and determines an Image_Score corresponding to the measured level of consistency (operation S620). Operation S620 is a process of determining the Image_Score corresponding to a factor of determining a score to be previously provided depending upon a level of consistency between the categories. For example, when the assigned object category of the photo is shown in the retrieved photo, a high Image_Score is determined, and when the assigned object category of the photo is not shown in the retrieved photo, a low Image_Score is determined.

The photo retrieval system 200 gives a score to the photo by applying the determined Image_Score and a previously provided weight (operation S630). Operation S630 is a process of determining a retrieval score of each of the retrieved photos by considering term frequency, document frequency, and image classification and giving a score by applying the weight to the determined retrieval score.

In operation S630, the photo retrieval system 200 may calculate a score $S_i$ given to a photo satisfying $$s_i = w \times \text{TF\_IDF\_Score} + (1-w) \times \text{Image\_Score} \quad \text{[Equation 1]}$$

in which the w indicates a weight for TF_IDF_Score.

In this case, The TF_IDF_Score that is a value of modeling a probability that an expanded query term is included in memo information of a corresponding photo may be calculated satisfying $$\text{TF\_IDF\_Score} = Pr(D_i \mid t_1 \ldots t_n) \cong \prod_{j=1}^{n} Pr(t_j \mid D_i) / Pr(DF_{tj}). \quad \text{[Equation 2]}$$

n this case, D indicates an annotation part of the photo, t indicates a query term, and DF indicates how many photos the query term is shown in the annotation part.

Also, the Image_Source that is a value probability that the category exists in the photo may be calculated satisfying $$\text{Image\_Score} = Pr(I_i \mid c_1 \ldots c_n) \cong \prod_{j=1}^{n} Pr(c_j \mid I_i) / Pr(I_i) \cong \prod_{i=1}^{n} Pr(g_i) \quad \text{[Equation 3]}$$

In this case, I indicates an image part of the photo, c indicates a category with respect to a keyword, $g_i$ is a reliability factor that is an output of a predetermined pattern classifier, and $Pr(g_i)$ indicates a posterior probability value acquired by recalculating the reliability factor by probability.

Namely, the photo retrieval system 200 may determine the ranking of each of the retrieved photos by using the score given to the photo by considering the retrieval precision.

Referring to FIG. 4, the photo retrieval system 200 arranges and displays the photo in response to the determined ranking (operation S440). In operation S440, since the photo is arranged depending upon the ranking and displayed on a screen as a retrieval result, the retrieval precision is high and the photo whose ranking is high is preferentially provided to the user.

Thus, according to an exemplary embodiment of the present invention, an object category with respect to a query term shown as an object in a photo from query terms forming a query is assigned and rankings of photos expansion retrieved using ontology are determined by considering the object category, thereby reducing an error occurring when expanding a query using the ontology.

Also, according to an exemplary embodiment of the present invention, a recall rate may be improved by supporting expansion retrieval using ontology as well as a photo that a user wants to retrieve may be preferentially displayed to the user as a higher ranking by determining a ranking by reflecting an object category assigned to the query.

In addition to the above-described exemplary embodiments, exemplary embodiments of the present invention can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter.

The computer readable code/instructions can be recorded in/on a medium/media in a variety of ways, with examples of the medium/media including magnetic storage media (e.g., floppy disks, hard disks, magnetic tapes, etc.), optical media (e.g., CD-ROMs, or DVDs), magneto-optical media (e.g., floptical disks), and hardware storage devices (e.g., read only memory media, random access memory media, flash memories, etc.). The medium/media may also be a distributed network, so that the computer readable code/instructions are stored and executed in a distributed fashion. The computer readable code/instructions may be executed by one or more processors. The computer readable code/instructions may also be executed and/or embodied in at least one application specific integrated circuit (ASIC) or Field Programmable Gate Array (FPGA).

In addition, hardware devices may be configured to act as one or more software modules in order to perform the operations of the above-described exemplary embodiments.

The term "module", as used herein, denotes, but is not limited to, a software or hardware component, which performs certain tasks. A module may advantageously be configured to reside on the addressable storage medium/media and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and the modules can operate at least one processor (e.g. central processing unit (CPU)) provided in a device.

The computer readable code/instructions and computer readable medium/media may be those specially designed and constructed for the purposes of the present invention, or they may be of the kind well-known and available to those skilled in the art of computer hardware and/or computer software.

An aspect of the present invention provides a photo retrieval method, system, and medium using multimodal information, capable of reducing an error in query expansion by using ontology to assign an object category with respect to a query term shown as an object in a photo from a query, and to determine a ranking of the expanded retrieved photos using the ontology by reflecting the object category.

An aspect of the present invention also provides a photo retrieval method, system, and medium using multimodal information capable of preferentially displaying a photo desired by a user to be higher-ranked, by improving recall rate by supporting expansion retrieval using ontology and determining a ranking by reflecting an object category assigned to a query.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A photo retrieval method implemented by a computing device which comprises a category assignor, an expansion retriever, a ranking determiner and a photo arranger, the method comprising:

using the category assignor, assigning an object category based on a query;

using the expansion retriever, retrieving photos associated with an expanded query term extracted from the query;

using the ranking determiner, identifying a category with respect to each retrieved photo by referring to content of each retrieved photo;

using the ranking determiner, measuring a level of consistency between the assigned object category and the identified category for each retrieved photo and determining an Image_Score corresponding to each measured level of consistency;

using the ranking determiner, assigning a score to each retrieved photo by applying the determined Image_Score and a previously provided weight;

using the ranking determiner, determining a ranking of the retrieved photos based on the assigned score; and using the photo arranger, arranging and displaying the photos in response to the determined ranking, wherein, in assigning the score to each retrieved photo, each score $s_i$ given to the photo is calculated by satisfying an equation as $$s_i = w \times \text{TF\_IDF\_Score} + (1-w) \times \text{Image\_Score}$$

in which w is a weight for TF_IDF_Score, wherein:

each TF_IDF_Score is a value of modeling a probability that the expanded query term is included in the memo information of the corresponding photo, and Image_Score is a probability that the category exists.

2. The method of claim 1, wherein the query comprises a plurality of query terms, and wherein assigning the object category comprises:

determining a keyword from the query terms forming the query; and assigning the object category to the determined keyword.

3. The method of claim 2, wherein, in determining the keyword, the keyword is determined to be query term shown as an object in the photo.

4. The method of claim 2, wherein assigning the object category to the determined keyword comprises:

calculating a distance between the keyword and each object category previously defined by ontology; and assigning, from a result of the calculation, object category with the least distance to be the determined keyword.

5. The method of claim 1, wherein the expanded query term includes a synonym or a hyponym existing in the ontology associated with the query.

6. The method of claim 1, wherein the retrieving photos associated with the expanded query term comprises:

maintaining a memory storing photos and memo information corresponding to each photo;

identifying memo information including the expanded query term from the memory; and extracting each photo corresponding to the identified memo information from the memory.

7. The method of claim 1, wherein the TF_IDF_Score that is the value of modeling the probability that the expanded query term is included in the memo information of the corresponding photo is calculated by satisfying an equation as $$\text{TF\_IDF\_Score} = Pr(D_i \mid t_1 \ldots t_n) \cong \prod_{j=1}^{n} Pr(t_j \mid D_i) / Pr(DF_{tj})$$

in which D indicates an annotation part, t indicates a query term, and DF indicates a number of photos including the expanded query term.

8. The method of claim 1, wherein the Image_Score that is the probability that the category exists in the corresponding photo is calculated by satisfying an equation as $$\text{Image\_Score} = Pr(I_i \mid c_1 \ldots c_n) \cong \prod_{j=1}^{n} Pr(c_j \mid I_i) / Pr(I_i) \cong \prod_{j=1}^{n} Pr(g_i)$$

in which I indicates an image part of the photo, c indicates a category with respect to the keyword, $g_i$ indicates a reliability factor of a predetermined pattern classifier, and Pr ($g_i$) indicates a posterior probability value acquired by recalculating the reliability factor as a probability.

9. The method of claim 1, wherein the computing device is one of mobile phone, personal digital assistant, personal computer, a notebook computer, or mobile communication query terminal.

10. At least one computer readable medium storing instructions that control at least one processor for executing a photo retrieval method implemented by a computing device which comprises of a category assignor, an expansion retriever, a ranking determiner and a photo arranger, the method comprising:

using the category assignor, assigning an object category based on a query;

using the expansion retriever, retrieving photos associated with an expanded query term extracted from the query;

using the ranking determiner, identifying a category with respect to each retrieved photo by referring to content of each retrieved photo;

using the ranking determiner, measuring a level of consistency between the assigned object category and the identified category for each retrieved photo and determining an Image_Score corresponding to each measured level of consistency;

using the ranking determiner, assigning a score to each retrieved photo by applying the determined Image_Score and a previously provided weight;

using the ranking determiner, determining a ranking of the retrieved photos based on the assigned score; and using the photo arranger, arranging and displaying the photos in response to the determined ranking, wherein, in assigning the score to each retrieved photo, each score $s_i$ given to the photo is calculated by satisfying an equation as $$s_i = w \times \text{TF\_IDF\_Score} + (1-w) \times \text{Image\_Score}$$

in which w is a weight for TF_IDF_Score, wherein:

each TF_IDF_Score is a value of modeling a probability that the expanded query term is included in the memo information of the corresponding photo, and Image Score is a probability that the category exists.

11. A photo retrieval system to retrieve photos using computing device which comprises a category assignor, an expansion retriever, a ranking determiner and a photo arranger, the system comprising:

a memory coupled to the computing device;

the category assignor to assign an object category based on a query;

the expansion retriever to retrieve photos associated with an expanded query term extracted from the query;

the ranking determiner to identify a category with respect to each retrieved photo by referring to content of each retrieved photo, to measure a level of consistency between the assigned object category and the identified category for each retrieved photo and to determine an Image_Score corresponding to the measured level of consistency, to assign a score to each retrieved photo by applying the determined Image—Score and a previously provided weight, and to determine a ranking of the retrieved photos based on the assigned score; and the photo arranger to arrange and display the photos in response to the determined ranking, wherein the ranking determiner calculates a score $s_i$ given to each photo, by satisfying an equation as $$s_i = w \times \text{TF\_IDF\_Score} + (1-w) \times \text{Image\_Score}$$

in which w is a weight for TF_IDF_Score, wherein:

each TF_IDF_Score is a value of modeling a probability that the expanded query term is included in the memo information of the corresponding photo, and Image_Score is a probability that the category exists.

12. The system of claim 11, wherein the category assignor determines a keyword from query terms forming the query; and assigns the object category to the determined keyword.

13. The system of claim 12, wherein the category assignor determines a query term shown as an object in the photo to be the keyword.

14. The system of claim 12, wherein the category assignor calculates a distance between the keyword and each object category previously defined by ontology; and assigns, from a result of the calculation, object category with the least distance to be the determined keyword.

15. The system of claim 11, wherein the expanded query term includes a synonym or a hyponym existing in the ontology associated with the query.

16. The system of claim 11, wherein the memory stores photos and memo information corresponding to each photo; and wherein the expansion retriever identifies memo information including the expanded query term from the memory, and extracts each photo corresponding to the identified memo information from the memory.

17. The system of claim 11, wherein the ranking determiner calculates the TF_IDF_Score that is the value of modeling the probability that the expanded query term is included in the memo information of the corresponding photo, by satisfying an equation as $$\text{TF\_IDF\_Score} = Pr(D_i \mid t_1 \ldots t_n) \cong \prod_{j=1}^{n} Pr(t_j \mid D_i) / Pr(DF_{tj})$$

in which D indicates an annotation part, t indicates a query term, and DF indicates a number of photos including the expanded query term.

18. The system of claim 11, wherein the ranking determiner calculates the Image_Score that is a probability that the category exists in the corresponding photo, by satisfying an equation as $$\text{Image\_Score} = Pr(I_i \mid c_1 \ldots c_n) \cong \prod_{j=1}^{n} Pr(c_j \mid I_i) / Pr(I_i) \cong \prod_{j=1}^{n} Pr(g_i)$$

in which I indicates an image part of the photo, c indicates a category with respect to the keyword, $g_i$ indicates a reliability factor of a predetermined pattern classifier, and Pr ($g_i$) indicates a posterior probability value acquired by recalculating the reliability factor as a probability.

* * * * *

UNITED STATES PATENT AND TRADEMARK OFFICE

CERTIFICATE OF CORRECTION

PATENT NO. : 7,739,276 B2
APPLICATION NO. : 11/822156
DATED : June 15, 2010
INVENTOR(S) : Jae Won Lee et al.

It is certified that error appears in the above-identified patent and that said Letters Patent is hereby corrected as shown below:

On the title page, item [75];

First Page, Column 1 (Inventors), Line 2, change “Daeleon” to --Daejeon--.

Column 14, Line 12, change “Image Score” to --Image_Score--.

Column 14, Line 29, change “Image-Score” to --Image_Score--.

Signed and Sealed this

Second Day of November, 2010

David J. Kappos
*Director of the United States Patent and Trademark Office*